THEATRICAL PROCEDURE AND SETTING FOR CREATING DISSOLVE ILLUSIONS
Filed April 9, 1962
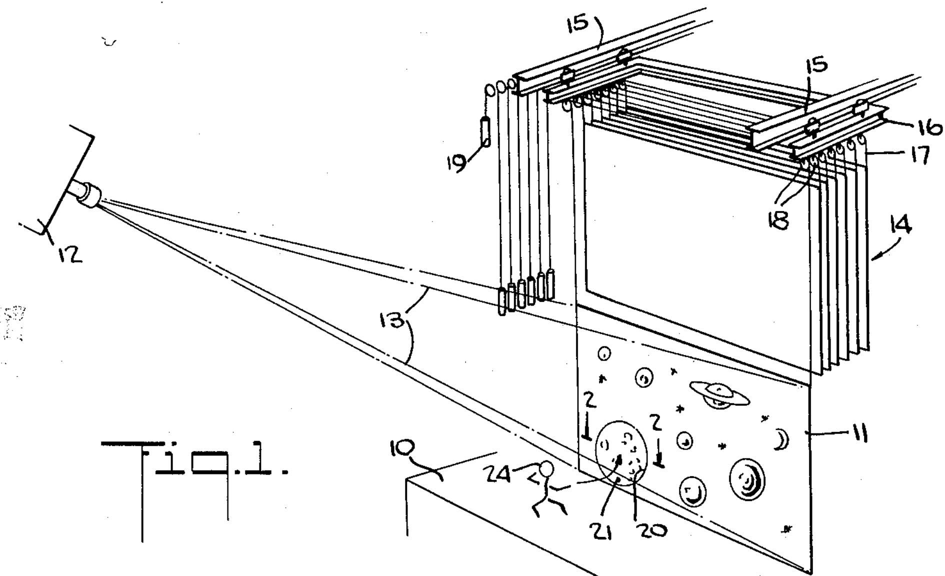
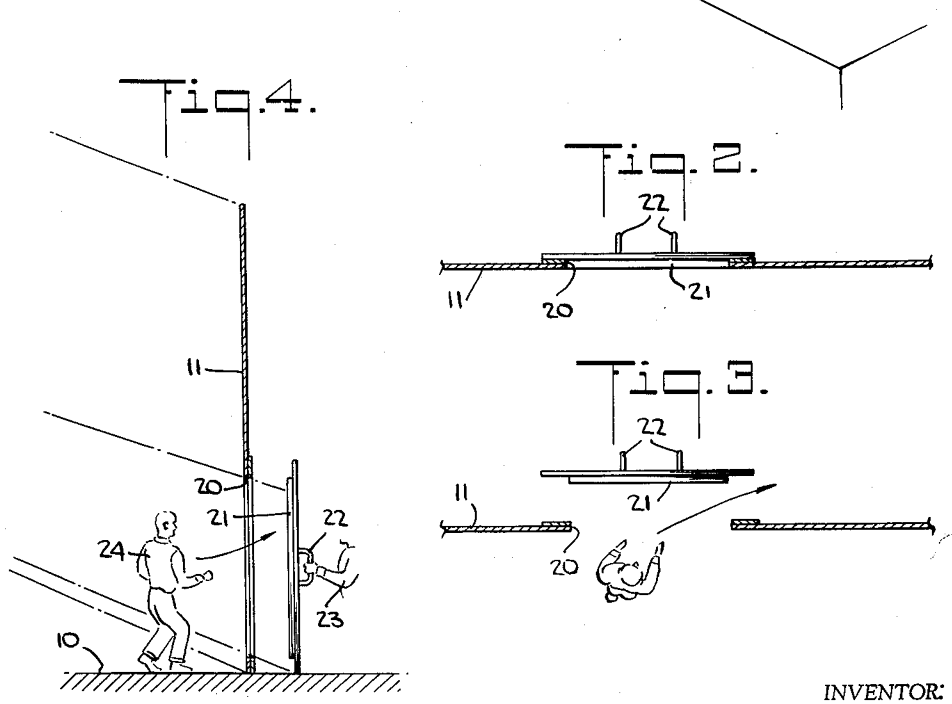
INVENTOR:
RALPH ALSWANG
BY Frederick Breitenfeld
ATTORNEY 3,084,933
Patented Apr. 9, 1963

3,084,933

THEATRICAL PROCEDURE AND SETTING FOR CREATING DISSOLVE ILLUSIONS

Ralph Alswang, Weston, Conn.

Filed Apr. 9, 1962, Ser. No. 186,006
5 Claims. (Cl. 272—10)

This invention relates generally to theatrical procedures, and has particular reference to a procedure for creating dissolve illusions between motion picture action and live action.

It is an object of the invention to provide an improved apparatus and procedure by means of which certain striking theatrical effects can be produced, involving interaction between screen-projected images and live actors. A more particular objective is to provide a theatrical procedure by means of which these effects can be achieved with unusual smoothness and efficiency.

The invention is predicated upon the employment of a motion picture screen having a predetermined section bodily shiftable out of the normal plane of the screen. A special relationship is caused to exist, between the screen and certain motion picture images projected upon it. In the first place, the images are calculated to camouflage the boundaries of, and thus conceal the presence of, the shiftable screen section. Additionally, at a predetermined time, certain screen action is calculated to distract the attention of the audience from the region of the shiftable screen section, and simultaneously this section is quickly and momentarily shifted to form a temporary aperture through the screen. During this short interval of time, live action can pass through the aperture from one side of the screen to the other.

It is a special feature of the invention to provide a series of motion picture screens having the characteristics and capabilities referred to, and to substitute one screen for another at predetermined times during uninterrupted projection of a motion picture. The screens have different shiftable sections correlated, respectively, to the camouflaging images and to the distracting screen actions that are projected onto them during the periods of use of the screens.

Another feature of the invention is to provide for the projection onto the screen, during screen-changing periods, of motion picture images calculated to camouflage the screen-changing activity.

A further objective of the invention is to provide relatively simple and thoroughly practical stage setting equipment for achieving the theatrical effects referred to.

One way of achieving these general objects, and such other objectives as may hereinafter appear or be pointed out, is illustratively exemplified in the accompanying drawings, in which—

FIG. 1 is a diagrammatic representation, in perspective, of a theatrical stage setting and related equipment for practising the invention;

FIG. 2 is a fragmentary cross-sectional view substantially along the line 2—2 of FIG. 1, with the shiftable screen section in its normal disposition;

FIG. 3 is a view similar to FIG. 2, showing the separable screen section temporarily shifted; and FIG. 4 is an elevational view at right angles to FIG. 3, indicating a typical theatrical action.

In each of the drawings, it is to be understood that the dimensions and proportions of the elements depicted are exaggerated and distorted in numerous respects, for the sake of clarity and simplicity of illustration.

In the stage setting depicted in FIG. 1, a stage for live action is designated 10, a motion picture screen 11 is supported in a position rising from the stage, and a motion picture projector 12 is adapted to cast motion picture images onto the screen, as indicated by the rays 13.

The screen 11 is one of a series of screens, preferably supported overhead, as indicated at 14, and provided with means for exposing the screens on the stage 10 in a predetermined sequence and for predetermined durations. This can be accomplished, for example, by providing screen-moving means for interposing one screen after another into the position of the screen 11 shown in FIG. 1. By way of illustration, an overhead crane is shown, involving a pair of spaced horizontal guide rails 15, and a carrier apparatus 16 movable along the rails 15 by a motor or other driving mechanism (not shown). The carrier structure 16 supports the screens on a series of cables 17 mounted on appropriate pulleys 18 and provided with counterweights 19 and other appropriate raising and lowering equipment. By suitable manipulation of this mechanism, one of the temporarily elevated screens can be dropped directly in front of the screen which is then receiving motion picture images, without interrupting the projection of the motion picture. The screen that has been supplanted can then be lifted. In this way, the screens can be lowered to image-receiving position in any desired predetermined sequence, each screen being left in position for a predetermined time depending upon the nature and requirements of the theatrical effect that is to be produced.

Each screen is provided with at least one separable section mounted for bodily movement out of the normal plane of the screen. By way of example, the screen 11 has been shown with a substantially circular opening 20 into which a separable section 21, of conforming shape, can be fitted as best indicated in FIG. 2. The section 21 can be provided with handles 22 on its reverse side, so that a stagehand (as indicated at 23 in FIG. 4) can shift the section 21 bodily out of the normal plane of the screen 11. This action takes place "on cue" and the shifting movement can be effected in any desired manner, not necessarily by manual action as described and illustrated.

The momentary shifting of the section 21 need not be of great magnitude. For example, a slight withdrawal of the section rearwardly of the plane of the screen will produce a temporary aperture through which a live actor 24 can easily move from one side of the screen to the other, as indicated in FIGS. 3 and 4. This can be produced with great rapidity, and the screen section restored to its normal position, to produce theatrical results of striking effectiveness, often of mystifying character.

It is a feature of the invention to correlate the nature of the motion picture projection to the structural nature of the screen employed at any given time. For example, during the period of employment of the screen 11, provided with the circular shiftable section 21, the motion picture images projected onto the screen include some which are calculated to camouflage the line of separation surrounding the section 21. In this way, the presence of a separable section 21 is effectively concealed. The nature of the camouflaging images can vary greatly, and will depend on the general nature of the motion picture that is being projected, and on the shape and location of the separable section 21.

Additionally, the screen action that is projected is calculated to distract the attention of the audience at a predetermined moment, so that the temporary shifting of the section 21 can be effected inconspicuously. Here, too, the nature of the distracting action will depend upon the subject with which the audience is involved, the location and nature of the shiftable screen section to be moved, and the nature of the live action to be dissolved into or out of existence with respect to the projected motion picture.

Obviously, each screen may be provided with more than one separable section, if the nature of the illusion calls for it. Moreover, it is to be understood that the term "live action" as used herein and in the appended claims, is not restricted to the movement of one of more live persons through a temporary aperture or apertures, but may include animals or inanimate things that are thrown or propelled through the screen from one side to the other.

Where the separable section is of circular shape, as shown by way of example in the present drawings, the projected images might conceivably involve other circular shapes moving in various ways to distract attention from the existence of, and location of, the section 21. However, the location and shape of the separable section is a matter of wide choice, as will be readily understood. The camouflaging images and the distracting screen action may also be widely varied in accordance with the results sought to be accomplished.

During the lowering of a substitute screen in front of the screen in use at any given time, the screen action or images can be so chosen as to distract from the vertical movement involved in the screen-substituting activity. Also, while reference has been made to the introduction of the new screen in front of the screen in use, it will be understood that the new screen may be lowered behind the screen in use, and the screen in front can then be raised at the appropriate time.

In general, it will be understood that many of the details herein described and illustrated can be modified in various respects without necessarily departing from the spirit and scope of the invention as expressed in the appended claims.

What is claimed is:

1. A theatrical procedure for creating dissolve illusions between motion picture action and live action, which consists in providing a motion picture screen having a section bodily shiftable out of the normal plane of the screen, providing a stage for live action in front of the screen, projecting onto the screen a motion picture including images calculated to camouflage the boundaries of, and thus conceal the presence of, said shiftable screen section, at a predetermined time displaying screen action calculated to distract attention from the region of said screen section, simultaneously quickly shifting said section momentarily to form a temporary aperture, and causing live action to pass through said aperture from one side of the screen to the other.

2. A theatrical procedure as defined in claim 1, including the provision of more than one motion picture screen of the character described, and the substitution of one screen for another at predetermined times during uninterrupted projection of the motion picture, said screens having different shiftable sections correlated respectively to the camouflaging images and distracting screen actions projected during the periods of use of said screens.

3. A theatrical procedure as defined in claim 2, including the projection during screen-changing periods of motion picture images calculated to camouflage the screen-changing activity.

4. A theatrical procedure for creating dissolve illusions between motion picture action and live action, which consists in providing a plurality of motion picture screens each having a different section bodily shiftable out of the normal plane of the screen, providing a stage for live action and exposing said screens on said stage in a predetermined sequence and for predetermined durations, projecting onto the screen in use at any given time a motion picture including images calculated to camouflage the boundaries of, and thus conceal the presence of the shiftable screen section of that particular screen, at a predetermined time displaying screen action calculated to distract attention from the region of said screen section, simultaneously quickly shifting said section momentarily to form a temporary aperture, and causing live action to pass through said aperture from one side of the screen to the other.

5. A theatrical stage setting comprising: a stage for live action, a motion picture projector, a plurality of motion picture screens, means for exposing said screens on said stage in a predetermined sequence and for predetermined durations, said means including screen-moving means for interposing one screen after another into single disposition in the path of light being projected uninterruptedly from said projector, and at least one separable section in each screen mounted for bodily shifting out of the normal plane of the screen, whereby the shift of a separable section of the screen in use at any given time, and the simultaneous projection onto the screen of action images calculated to distract attention from the region of said section, provides a temporary undetected aperture through which live action can pass from one side of the screen to the other to create a dissolve illusion between such action and the motion picture action.

References Cited in the file of this patent

UNITED STATES PATENTS

| | | |
|---|---|---|
| 1,186,292 | De Soria | June 6, 1916 |
| 1,273,111 | Paoli | July 16, 1918 |

FOREIGN PATENTS

| | | |
|---|---|---|
| 196,326 | Great Britain | Apr. 17, 1923 |